United States Patent
Xie et al.

(10) Patent No.: US 8,856,098 B2
(45) Date of Patent: Oct. 7, 2014

(54) RANKING SEARCH RESULTS BASED ON WORD WEIGHT

(75) Inventors: Yuheng Xie, Hangzhou (CN); Fei Xing, Beijing (CN); Ning Guo, Hangzhou (CN); Lei Hou, Beijing (CN); Qin Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 173 days.

(21) Appl. No.: 12/804,229

(22) Filed: Jul. 15, 2010

(65) Prior Publication Data

US 2011/0016111 A1    Jan. 20, 2011

(30) Foreign Application Priority Data

Jul. 20, 2009    (CN) .......................... 2009 1 0151647

(51) Int. Cl.
*G06F 7/00*    (2006.01)
*G06F 17/30*    (2006.01)

(52) U.S. Cl.
CPC .............................. *G06F 17/30687* (2013.01)
USPC ........................... 707/706; 707/722; 707/758

(58) Field of Classification Search
CPC ................................................. G06F 17/30687
USPC .................................. 707/705, 706, 722, 758
See application file for complete search history.

(56) References Cited

U.S. PATENT DOCUMENTS

| | | | |
|---|---|---|---|
| 6,018,735 A * | 1/2000 | Hunter ................................. | 1/1 |
| 6,631,372 B1 | 10/2003 | Graham | |
| 6,633,868 B1 * | 10/2003 | Min et al. .......................... | 707/3 |
| 8,051,187 B2 * | 11/2011 | Noy et al. ..................... | 709/229 |
| 8,073,849 B2 * | 12/2011 | Lai et al. ........................ | 707/736 |
| 8,321,425 B2 | 11/2012 | Custis et al. | |
| 2002/0103798 A1 | 8/2002 | Abrol et al. | |
| 2004/0002849 A1 * | 1/2004 | Zhou ................................. | 704/4 |
| 2004/0064447 A1 | 4/2004 | Simske et al. | |
| 2005/0154723 A1 | 7/2005 | Liang | |
| 2005/0198026 A1 | 9/2005 | Dehlinger et al. | |
| 2007/0136281 A1 | 6/2007 | Li et al. | |
| 2007/0250501 A1 | 10/2007 | Grubb et al. | |
| 2008/0016053 A1 | 1/2008 | Frieden et al. | |
| 2008/0016061 A1 | 1/2008 | Frieden et al. | |
| 2008/0016071 A1 | 1/2008 | Frieden | |
| 2008/0016098 A1 | 1/2008 | Frieden et al. | |
| 2008/0162456 A1 * | 7/2008 | Daga et al. ........................ | 707/5 |
| 2010/0185611 A1 | 7/2010 | Liao et al. | |

FOREIGN PATENT DOCUMENTS

JP    2000194713    7/2000

* cited by examiner

*Primary Examiner* — Marc Somers
(74) *Attorney, Agent, or Firm* — Van Pelt, Yi & James LLP

(57) ABSTRACT

Ranking search results, comprises retrieving search results that include target strings that relate to a query string; segmenting the query string and each of the target strings; pairing segments in the query string with respective segments in the target strings to form combinations; retrieving weights that correspond to the combinations; and determining a weighted word length based on the weights corresponding to each of the target strings; and ranking the target strings based on their respective weighted word lengths. Alternatively, ranking search results includes determining a minimum weight of each inserted word with respect to segments in the query string; determining a minimum weight of each deleted word with respect to segments in the target strings; determining a total edit distance for each target string; and ranking the target strings based on the total edit distances.

20 Claims, 5 Drawing Sheets

RANKING SEARCH RESULTS BASED ON WORD WEIGHT

CROSS REFERENCE TO OTHER APPLICATIONS

This application claims priority to People's Republic of China Patent Application No. 200910151647.3 entitled METHOD AND DEVICE FOR RANKING SEARCH RESULTS filed Jul. 20, 2009 which is incorporated herein by reference for all purposes.

FIELD OF THE INVENTION

The present application relates to the field of computer data processing and in particular to a method for ranking search results and a device thereof.

BACKGROUND OF THE INVENTION

A search engine generally estimates the extent to which a search result (also referred to as a target string) matches a query string according to a distance of the position where several words in the query string occur among the search result and one with a shorter distance is typically matched to a higher extent and thus is higher ranked. For a query string "disinfection machine", for example, a search result including "disinfection machine" tends to be closer to the intention of a user than "disinfection equipment", which is closer still to the intention of the user than "industrial disinfection washing machine", "dehydrator", and "dryer", all of which will have some influence on the ranking of the search results.

Standard techniques for ranking search results are typically based on the distance of words in a query string within a target string using the shortest sliding window (i.e., the shortest interval located in the target string that includes the words in the query string), edit distance of query string and target string, word context as Part of Speech (POS), etc.

These simple techniques tend not to address the issue of correlation between a query search of strings and a target string, and the results often do not accurately reflect the extent to which query search of strings matches the target string. Take a query string "Nokia battery" as an example, three search results A, B, and C include the strings "Nokia battery", "Nokia cell phone, complimentary battery", and "Nokia n73 cell phone with original battery", respectively. The simple distance calculation shows that the distance between with "Nokia" and "battery" in string A is zero and thus A has the highest degree of match. The distances between "Nokia" and "battery" for strings B and C are three and five words, respectively, indicating that C is a poorer match than B. However, based on the user's intent to locate a Nokia battery, search result C in fact is a better match than B despite the greater word spacing.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Ranking of target strings while accounting for certain semantic factors is described. The ranking takes into consideration the semantic correlation between a query string and a target string to better evaluate the extent to which the query string matches the target string and generate a ranking of search results in a search engine for an ecommerce platform that more closely tracks the intent of typical users. Examples involving using the technique in search engines are discussed extensively for purposes of illustration. The technique is also applicable to many other applications.

Figure 1:
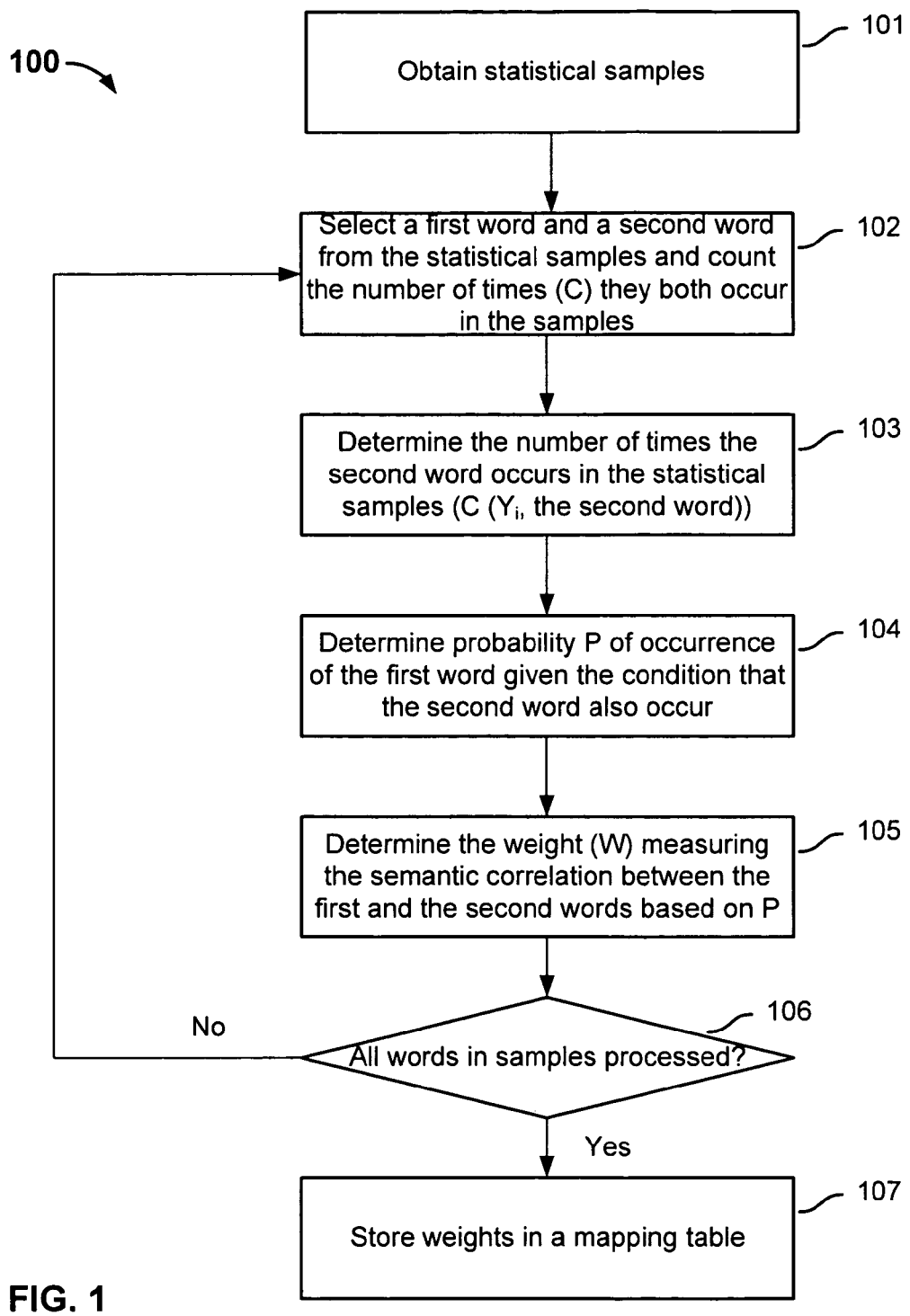
FIG. 1 is a flowchart illustrating an embodiment of a process for generating a mapping of word weights.

In some embodiments, to account for the semantic correlation between strings in a sample set, the semantic correlation between every two words in the sample set is weighted to generate a table of word weights. FIG. 1 is a flowchart illustrating an embodiment of a process for generating a mapping of word weights. Process 100 may be performed on a server, a search engine, or any other appropriate device. The generated mapping of word weights are stored and used later.

At 101, statistical samples are obtained from texts or collections of symbols having a variety of formats, such as webpages, user search logs, user selection logs, etc.

Generally, the greater the number of times that a first word and a second word both occur in the statistical samples, the more correlated they are. For example, if both "Nokia" and "cell phone" occur in the text or if users often search for "Nokia" and then select a result that includes the term "cell phone", it indicates that "Nokia" and "cell phone" are highly correlated.

At 102, a first word and a second word are selected from the statistical samples, the number of times that the first and second words both occur in the statistical sample is counted, and denoted as C (the first word, the second word). For example, the number of times that both "cell phone" and "Nokia" occur in the samples is counted and recorded as C (cell phone, Nokia). Subsequently the weights for the respective words are computed to be used later for generating a ranking of the search results.

At 103, the number of times that the second word occurs in the statistical sample is counted and recorded as $\Sigma C\ (Y_i$, the second word), where $Y_i$ denotes the respective words occurring together with the second word. For example, the total number of times that "Nokia" occurs together with other words (such as "battery", "original", etc.), which is equivalent to the total number of times that "Nokia" occurs in the samples, is counted and recorded as $\Sigma C\ (Y_i$, "Nokia"), where $Y_i$ denotes the respective words occurring together with "Nokia".

At 104, the probability P of occurrence of the first word given the condition that the second word also occurs is calculated as follows:

$P$(the first word|the second word)=$C$(the first word,the second word)/$\Sigma C(Y_i$, the second word).

For example, a probability of occurrence of "cell phone" given that the condition that "Nokia" also occurs is calculated as:

$P$(cell phone|Nokia)=$C$(cell phone)/$\Sigma C(Y_i$, Nokia).

At 105, the weight measuring the semantic correlation between the first and second words is determined. In this example, the weight W is determined according to W=1−P for a given search for the second word, where W is the weight and P is the probability of the first word on the condition that the second word occurs.

For example, the semantic correlation between "cell phone" and "Nokia" is weighted by W=1−P=1−P (cell phone|Nokia)=1−C (cell phone)/$\Sigma C\ (Y_i$, Nokia) during a search for "Nokia".

Although a weight of W=1−P is used in this example for purposes of illustration, the weight can be calculated in other ways. For example, in some embodiments, the weight is set to P. Weights can also be transformed into different forms in some embodiments, such as in logarithmic form.

At 106, it is determined whether the above steps have been performed for all the words in the statistical samples and if so, then control goes to 107; otherwise, 102-106 are repeated to weight sequentially the semantic correlations between the respective words and the other respective words in the statistical samples.

At 107, the weights of the semantic correlations between the respective words and the other respective words in the statistical sample are stored as a mapping table of word weights and optionally output. Other appropriate formats such as lists, trees, etc. can also be used.

An example of a table of word weights is depicted in Table 1:

Table 1

| Word 1 | Word 2 | Weight |
|---|---|---|
| Cell Phone | Nokia | W12 |
| Cell Phone | Battery | W13 |

Table 1-continued

| Word 1 | Word 2 | Weight |
|---|---|---|
| Nokia | Battery | W23 |
| ... | ... | |
| The $m^{th}$ word | The $n^{th}$ word | Wmn |

The example table of word weight depicted in Table 1 is merely illustrative, and the table of word weights can be embodied in other forms in other embodiments. Also, a word can be weighted in many different ways, and FIG. 1 merely illustrates an embodiment of a statistic probability derived from a statistic language model. The weights can be derived using other appropriate techniques, such as calculated automatically or configured manually.

Figure 2:
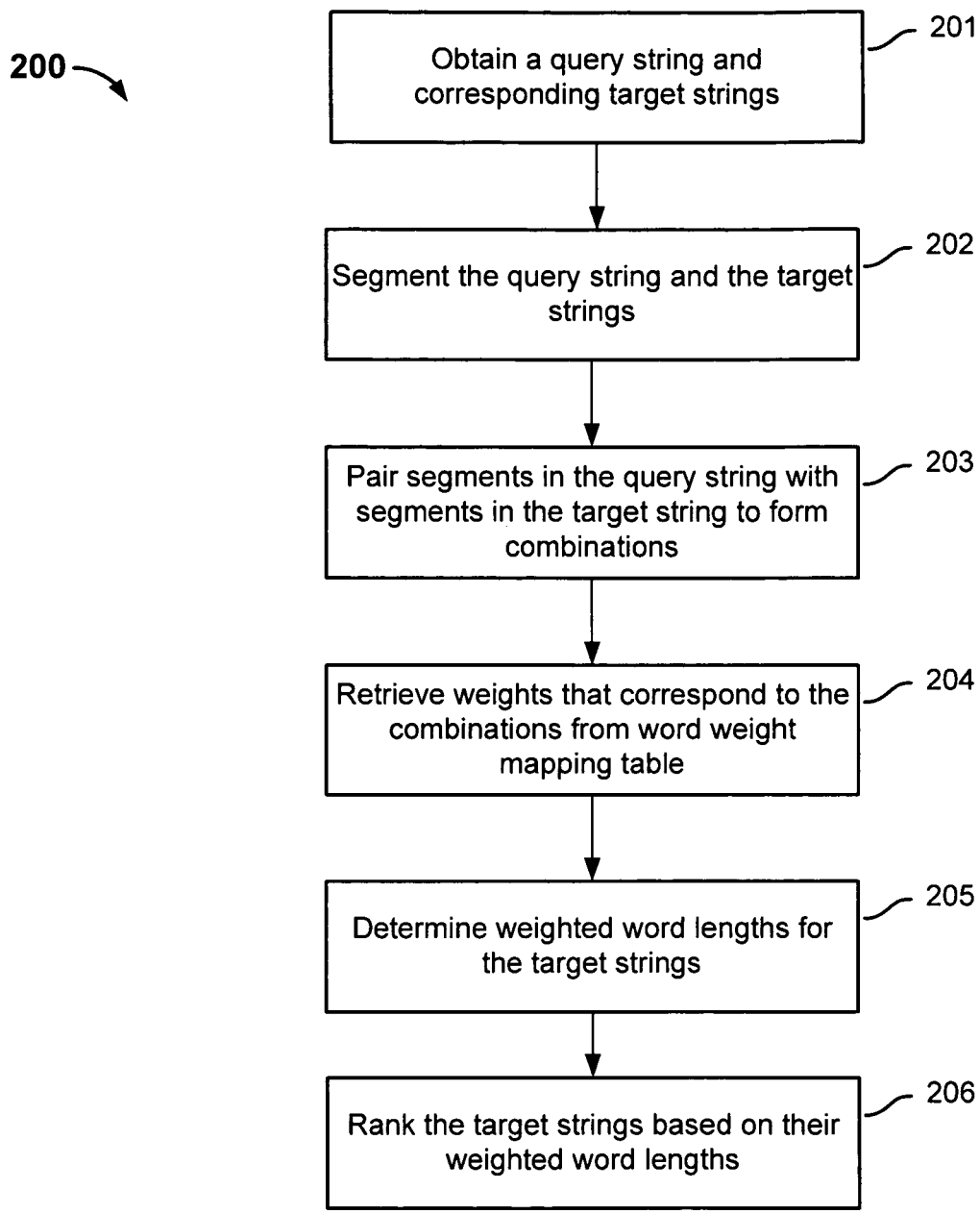
FIG. 2 is a flowchart of an embodiment of a process for ranking search results.

FIG. 2 is a flowchart of an embodiment of a process for ranking search results. Process 200 may be performed on a server or any other appropriate device. The extent to which the target strings match the query string (also referred to as the matching extent) is determined.

At 201, a query string and corresponding target strings are obtained. In some embodiments, the query string includes keywords input by a user, which is used to identify the targets strings in a database of potential results. A variety of techniques such as keyword or index matching can be used to obtain the target strings. The target strings include characters that are correlated with the query string. For example, if the user inputs a query string of "Nokia Battery" and the target strings retrieved at the server are String A "Nokia Battery", String B "Nokia Cell Phone With Free Battery", and String C "Nokia n73 Cell Phone With Original Battery", then all the retrieved strings A, B, and C are target strings.

At 202, the query string and the target strings are segmented. Here, Q denotes the query string, T denotes the target string, the query string is segmented into words $Q_1Q_2 \ldots Q_m$, and the target string is segmented into words $T_1T_2 \ldots T_n$. Other segmentation techniques are possible, such as segmentation of the strings into semantic words, characters, letters, symbols, etc.

In this example, the query string is segmented into $Q_1Q_2$=Nokia|battery. Target string C is segmented into $T_1T_2T_3T_4T_5$=Nokia|n73|cell phone|original|battery. Other target strings can be similarly segmented.

At 203, the respective segmented words in the query string are combined sequentially in pairs with the segmented words in the target strings into combinations of segmented words, where each combination includes a segmented word in the query string and a segmented word of the target query of characters. Specifically, $(T_i, Q_1), (T_i, Q_2) \ldots (T_i, Q_m)$ are derived.

Resulting combinations of segmented words from the query string and target string C are: $(T_1, Q_1), (T_1, Q_2), (T_2, Q_1), (T_2, Q_2), (T_3, Q_1), (T_3, Q_2), (T_4, Q_1), (T_4, Q_2), (T_5, Q_1)$, and $(T_5, Q_2)$.

At 204, the previously generated table of word weights is looked up and the weights of the respective combinations of segmented words are retrieved.

Here, W denotes the weight and the weights of the respective combinations of segmented words retrieved from the table of word weights are: W (T1, Q1), W (T1, Q2), W (T2, Q1), W (T2, Q2), W (T3, Q1), W (T3', Q2), W (T4, Q1), W (T4, Q2), W (T5, Q1), and W (T5, Q2).

Let W (T1, Q1)=W1 W (T1, Q2)=W1'
W (T2, Q1)=W2 W (T2, Q2)=W2'
W (T3, Q1)=W3 W (T3, Q2)=W3'
W (T4, Q1)=W4 W (T4, Q2)=W4'
W (T5, Q1)=W5 W (T5, Q2)=W5'

Particularly, if Ti is among Q, then Wi=0. For example, since both T1 and Q1 are "Nokia", W (T1, Q1)=W1=0; similarly, since T5 and Q2 are both "Battery", W (T5, Q2)=W5'=0.

At 205, a weighted word length for each target string is calculated based on the weights of segmented words. In some embodiments, the weighted word length is the weighted length of the shortest sliding window.

To determine the weighted word length, in some embodiments, the minimum weights of the segmented words in the target string with respect to the corresponding segmented words in the query string are calculated. In some embodiments, the minimum weights of the segmented words in the query string with respect to the respective segmented words in the target string are calculated. Since a process of calculating the minimum weights of the respective segmented words in the target string with respect to the respective segmented words in the query string is very similar to a process of calculating the minimum weights of the respective segmented words in the query string with respect to the respective segmented words in the target string, only the former will be described in detail below for purposes of illustration.

Accordingly, the smaller of the two weights corresponding to (T1, Q1) and (T1, Q2), the smaller of the two weights corresponding to (T2, Q1) and (T2, Q2), etc. are determined.

In this example, it is assumed that between W (T1, Q1) and W (T1, Q2), W (T1, Q1) is smaller; between W (T2, Q1) and W (T2, Q2), W (T2, Q1) is smaller; between W (T3, Q1) and W (T3, Q2), W (T3, Q1) is smaller; between W (T4, Q1) and W (T4, Q2), W (T4, Q1) is smaller; and between W (T5, Q1) and W (T5, Q2), W (T5, Q2) is smaller. Thus, according to the notations above, the minimum weights are: W1, W2, W3, W4, and W5'.

Next, the weighted length of the shortest sliding window is calculated based on the minimum weights for the target string. In some embodiments, the weighted length of the shortest sliding window of the target string, $W_{sw}$, is calculated as follows:

$$W_{sw} = \sum_{i=k}^{h} W_i = \sum_{i=k}^{h} \min_{j=1}^{m} w(T_i, Q_j).$$

Where W denotes the weight, $T_i$ denotes the $i^{th}$ segmented word in the target string, k and h denote the starting and ending positions of the shortest sliding window of the target string, respectively, $Q_j$ denotes the $j^{th}$ segmented word in the query string, and m denotes the number of segmented words in the query string.

In this example, the weighted length of the shortest sliding window is:

$$W_{sw} = \Sigma Wi = W1 + W2 + W3 + W4 + W5'.$$

Once the weighted lengths of the shortest sliding windows in the query string with respect to all the target strings are computed, at 206, the extent to which the query string matches the target string is determined based on the weighted word length. The respective target strings of characters are ranked by the weighted word lengths, and a ranking result is optionally sent back to the user terminal.

Ranking involves comparing the weighted lengths of the shortest sliding windows of the respective target strings. The smaller the length, the higher the extent of match and the higher the ranking of a target string; the greater the length, the lower the extent of match and the lower the ranking of the target string.

The extent to which the query string matches the respective target strings of characters is more accurately determined by process 200 than by traditional calculation methods that do not account for semantic correlations between words in a target string and words in a query string. For example, although target strings "Nokia battery" and "Nokia n73 cell phone original battery" differ in length, they are both highly relevant for the query string of "Nokia battery" since their weighted word lengths are similar. The application can introduce a word weight indicating the semantic correlation between a query string and a target string to rank accurately respective target strings of characters by ranking highly those target strings of characters correlated with the query string to thereby reflect the extent to which the respective target strings match the query string and can be applied simply and effectively in practice.

Figure 3:
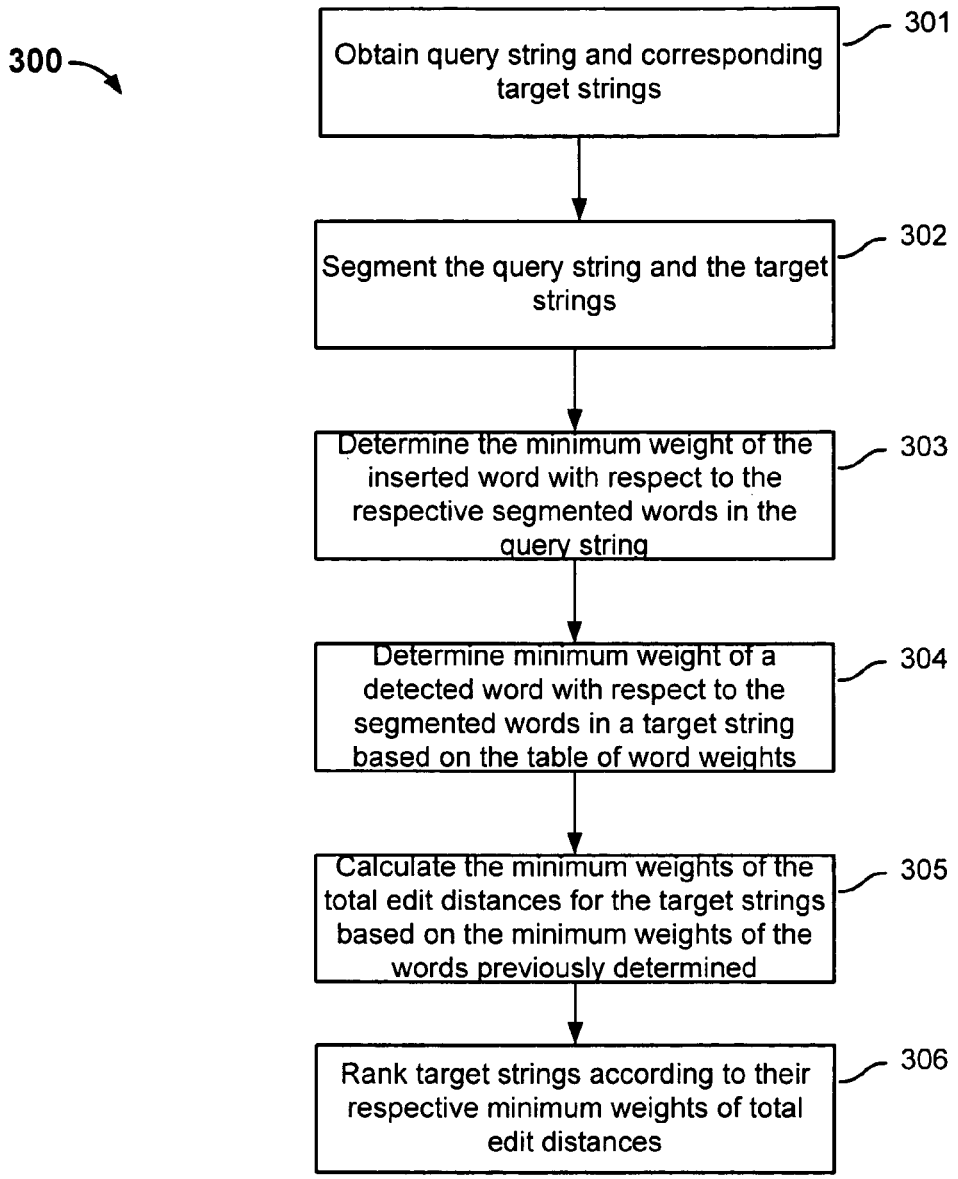
FIG. 3 is a flowchart of another embodiment of a process for ranking search results.

FIG. 3 is a flowchart of another embodiment of a process for ranking search results. Process 300 determines the extent to which the target strings match the query string based on their edit distance. As used herein, the edit distance refers to the number of elementary operations required to change one string of characters to another or the sum of the lengths of different parts of two strings of characters. Typical elementary operations include insertion, deletion, or substitution of a character/word or other designated operations. For example, "I love you" is changed to "I don't love her" with at least by two elementary operations, i.e., inserting "don't" and replacing "you" with "her", so the edit distance between the two strings is two.

At 301, a query string and corresponding target strings are obtained by the server. This is similar to 201 of process 200. For example, for the query string of "Nokia cell phone battery" and target strings are "original Nokia battery", "Samsung cell phone battery", etc.

At 302, the query string and the target string are segmented into segmented words constituting the query string and segmented words constituting the target string, respectively. Here, Q denotes the query string, T denotes the target string, the query string is segmented into words $Q_1Q_2 \ldots Q_m$, and the target string is segmented into words $T_1T_2 \ldots T_n$. Specifically, the query string "Nokia cell phone battery" is word-segmented into Q1Q2Q3="Nokia|cell phone|battery", and the target string is divided into T1T2T3= "original|Nokia|battery".

At 303, based on the pre-computed mapping of word weights, the minimum weight of an inserted word with respect to the respective segmented words in the query string is determined. The weights of the inserted word with respect to the respective segmented words in the query string are retrieved from the table of word weights. In this example, the weights of the inserted word "original", denoted as I1, with respect to the respective segmented words in the query string of character are: W (I1, Q1), W (I1, Q2), and W (I1, Q3).

The minimum weight of the inserted word with respect to the respective segmented words in the query string is calculated as:

$$\sum_{t=1}^{n} w_I = \sum_{t=1}^{n} \min_{j=1}^{m} w(I_t, Q_j),$$

where W denotes the weight, $I_t$ denotes the $t^{th}$ segmented word in the inserted string of character, n denotes the number of inserted segmented words, $Q_j$ denotes the $j^{th}$ segmented word in the query string, and m denotes the number of segmented words in the query string.

At 304, the minimum weight of a deleted word with respect to the segmented words in the target string is calculated based on the table of word weights. The weights of the deleted word with respect to the respective segmented words in the target string are retrieved the table of word weights. In this example, the weights of the deleted word "cell phone", denoted as D1, with respect to the respective segmented words in the target string are: W (D1, T1), W (D1, T2), and W (D1, T3).

The minimum weight of the deleted word with respect to the segmented words in the target string are calculated as:

$$\sum_{d=1}^{p} w_D = \sum_{d=1}^{p} \min_{i=1}^{q} w(T_i, D_d),$$

where W denotes the weight, Ti denotes the $t^{th}$ segmented word in the target string, q denotes the number of segmented words in the target string, $D_d$ denotes the $d^{th}$ segmented word in the deleted word, and p denotes the number of deleted segmented words.

Sometimes the edit distance involves substitution of words. For example, one string is "Nokia Battery" and another is "Samsung Battery", where "Samsung" substituted "Nokia". In some embodiments, the substitution operation is regarded as a combination of addition and deletion operations instead of a separate operation. For example, it can be assumed that "Nokia" is deleted and "Samsung" is added to change "Nokia Battery" to "Samsung Battery". Accordingly, the computation described above involving inserted or deleted word is used to determine the minimum weight of the edit distance.

In some embodiments, the substitution operation is regarded as a third type of operation in addition to the insertion and deletion. One way to determine the minimum weight of the edit distance of the replacement word is setting it to a preset fixed value (e.g., 1). Other ways include setting the edit distance of the replacement word to the sum, the average, the maximum, or any other appropriate combination of the minimum weight of the inserted word with respect to the respective segmented words in the query string and the minimum weight of the deleted word with respect to the respective segmented word in the target string.

For example, in some embodiments, the edit distance of the replacement word "Samsung" is the sum of the minimum weight of the inserted word "Samsung" with respect to the segmented words in the query string "Nokia Battery" and the minimum weight of the deleted word "Nokia" with respect to the segments word in the target string "Samsung Battery".

Alternatively, in some embodiments, the edit distance of the replacement word "Samsung" is the sum of the minimum weight of the inserted "Samsung" with respect to the segmented words in the query string "Nokia Battery" and the minimum weight of the deleted word "Nokia" with respect to the segments words in the target string "Samsung Battery" and divided by two.

At 305, the minimum weights of the total edit distances for the target strings are calculated based on the minimum weights of the words determined in the previous steps and the values used to determine the extent to which the query string matches the target strings.

In embodiments where only the insert and delete operations are considered, the total edit distances are calculated for the respective target strings of characters, and the total edit distance in a target string of character is:

$$W_{Total} = W_I + W_D,$$

where $W_{Total}$ denotes the minimum weight of the total edit distance, $W_I$ denotes the minimum weight of the inserted word with respect to the respective segmented words in the query string, and $W_D$ denotes the minimum weight of the deleted word with respect to the respective segmented words in the target string.

In embodiments where insert, delete, and substitute operations are considered, the total distance edit distances are calculated for the respective target strings, and the total edit distance is:

$$W_{Total} = W_I + W_D + W_S$$

where $W_{Total}$ denotes the total edit distance, $W_I$ denotes the minimum weight of the inserted word with respect to the respective segmented words in the query string, $W_D$ denotes the minimum weight of the deleted word with respect to the respective segmented words in the target string, and $W_S$ denotes the minimum weight of the substituted word with respect to the respective segmented words in the query string and/or the target string.

At 306, the minimum weights of the total edit distance of the target strings are compared to generate a ranking. The smaller the minimum weight of the total edit distance, the greater the extent of matching and the higher the target string is ranked. Conversely, the greater the minimum weight of the total edit distance, the smaller the extent of matching and the lower the target string is ranked.

Processes 200 and 300 can be implemented in a variety of different ways.

A weight can be calculated alternately with respect to the query string and the target string. The inserted string of characters can be weighted with respect to the query string and the deleted string of characters can be weighted with respect to the target string.

A weight can be calculated or transformed in any form, for example, logarithmically, or a target word can be weighted by the maximum, the average or another form ("weighted length") of the weights of the target word with respect to the respective query words. The order of the target strings and the query string can be reversed in some embodiments.

A word distance or length can be calculated throughout a string of characters or in any algorithmically selected interval ("e.g., a different part of one string of characters from another string of characters").

Ranking may involve the calculation of any weighted word distance or length instead of the shortest sliding window or an edit distance.

Figure 4:
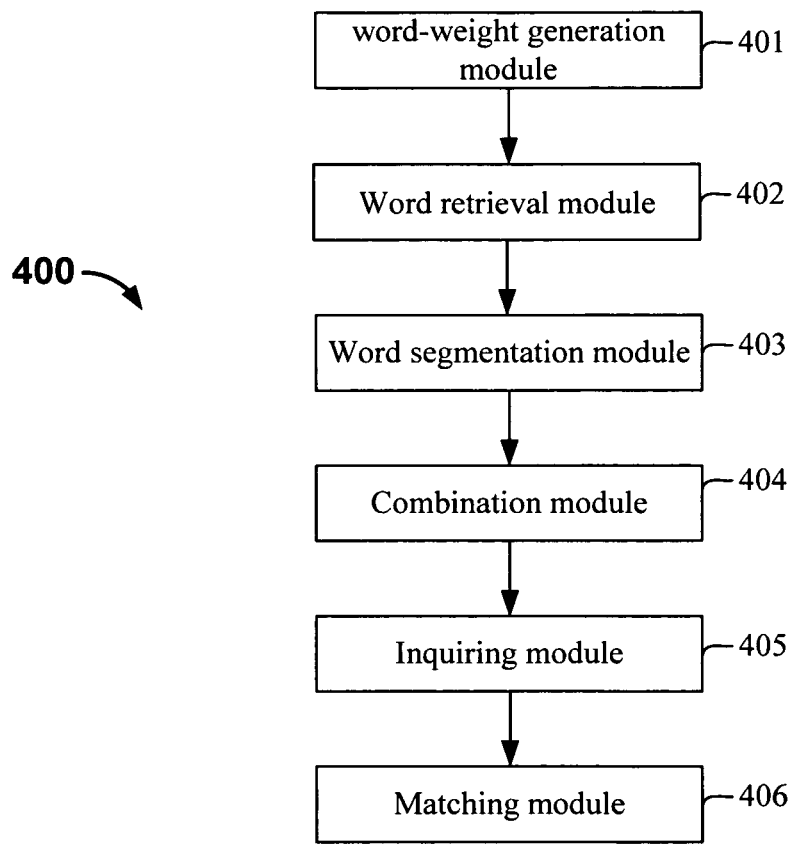
FIG. 4 is a block diagram illustrating an embodiment of a system for ranking search results.

FIG. 4 is a block diagram illustrating an embodiment of a system for ranking search results. System 400 includes: a word weight generation module 401 adapted to weigh the semantic correlation between every two words in a set of statistical samples and to generate and store a table of word weights; a word retrieval module 402 adapted to receive a query string and to search for the query string and to retrieve target strings of characters; a word segmentation module 403 adapted to segment the query string and each of the target strings; a combination module 404 adapted to combine the respective segmented words in the query string sequentially in pairs with the respective segmented words in the target string; an inquiring module 405 adapted to inquire of the table of word weights to retrieve the weights of the respective combinations of segmented words; and a matching module 406 adapted to calculate a weighted word length from the weights, to rank the target strings based on the weighted word length, and to optionally feed back a ranking result to the user terminal.

In some embodiments, word weight generation module 401 further includes: a sample acquisition module adapted to acquire the statistical samples; a first counting module adapted to select a first word and a second word from the statistical samples and to count the number of times that both the first and second words occur in the statistical sample as C (the first word, the second word); a second counting module adapted to count the number of times that the second word occurs in the statistical sample as ΣC ($Y_i$, the second word), where $Y_i$ denotes a word occurring together with the second word in the samples; a probability calculation module adapted to calculate the probability of the first word on the condition that the second word occurs as P (the first word|the second word)=C (the first word, the second word)/ΣC (Yi, the second word); a weighting module adapted to calculate the weight of the semantic correlation between the first and second words, for example, as W=1−P during a search for the second word, where W is the weight and P is the probability of the first word on the condition that the second word occurs; and a generation module adapted to generate the table of word weights from the weights of the semantic correlations between the respective words and the respective other words in the statistical sample.

In some embodiments, the weighted word length is the weighted length of the shortest sliding window and matching module 406 further includes: a minimum weight calculation module adapted to calculate the minimum weights of the segmented words in the target string with respect to the segmented words in the query string or the minimum weights of the segmented words in the query string with respect to the segmented words in the target string; a first calculation module adapted to calculate the weighted lengths of the shortest sliding windows for the respective targets string of characters according to the minimum weights; and a ranking module adapted to compare the weighted lengths of the shortest sliding windows of the respective target strings and to rank the target strings based on the weighted lengths.

Figure 5:
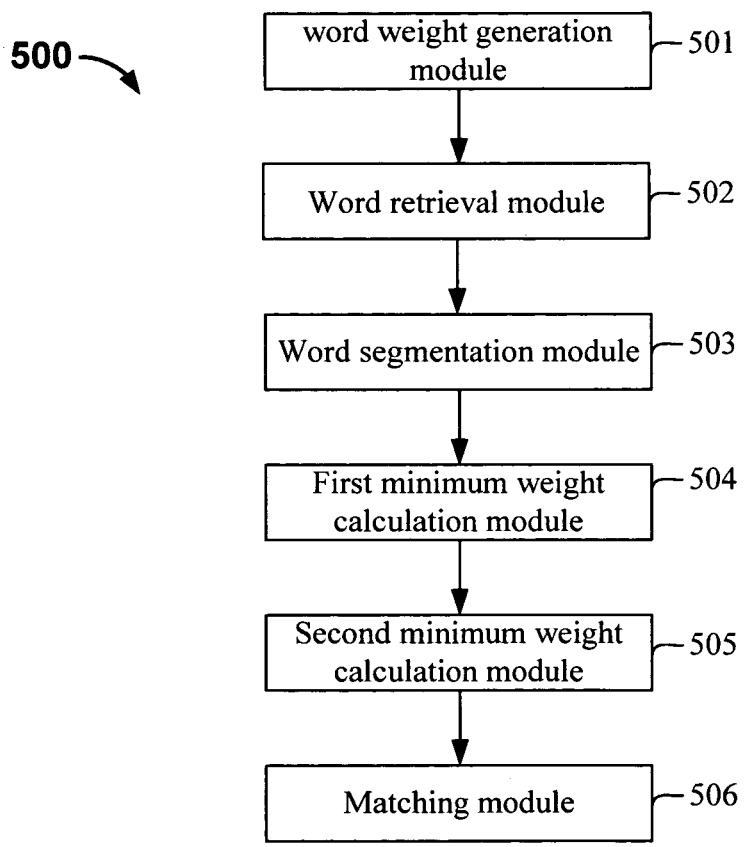
FIG. 5 is a block diagram illustrating another embodiment of a system for ranking search results.

FIG. 5 is a block diagram illustrating another embodiment of a system for ranking search results. System 500 includes: a word-weights generation module 501 adapted to weight the semantic correlation between every two words in a set of statistical samples and to generate and store a table of word weights; a word retrieval module 502 adapted to receive a query string and to search for the query string and to retrieve target strings of characters; a word segmentation module 503 adapted to segment the query string and each of the target strings of characters; a first minimum weight calculation module 504 adapted to calculate the minimum weight of an inserted word with respect to the segmented words in the query string; a second minimum weight calculation module 505 adapted to calculate the minimum weight of a deleted word with respect to the segmented words in the target string; and a matching module 506 adapted to calculate a total edit distance from the minimum weights, to rank the respective target strings of characters and to optionally feed back a ranking result to the user terminal.

In some embodiments, the matching module 506 includes: a total edit distance calculation module adapted to calculate the total edit distances for the respective target strings of characters as $W_{Total}=W_I+W_D$, where $W_{Total}$ denotes the total edit distance, $W_I$ denotes the minimum weight of the inserted word with respect to the segmented words in the query string, and $W_D$ denotes the minimum weight of the deleted word with respect to the segmented words in the target string; a ranking module adapted to compare the total edit distances of the respective target strings of characters and to rank target strings based on the total edit distance.

In some embodiments, system 500 further includes a third minimum weight calculation module adapted to calculate the minimum weight of the edit distance of a replacement word prior to calculation of the total edit distance. Accordingly, the total edit distance calculation module is adapted to calculate the total edit distances for the respective target strings of characters as $W_{Total}=W_I+W_D+W_C$, where $W_{Total}$ denotes the total edit distance, $W_I$ denotes the minimum weight of the inserted word with respect to the respective segmented words in the query string, $W_D$ denotes the minimum weight of the deleted word with respect to the respective segmented words in the target string, and $W_C$ denotes the minimum weight of the replacement word with respect to the respective segmented words in the query string and/or the target string.

Systems 400 and 500 use a word weight to indicate the semantic correlation between a query string and a target string to more accurately reflect the extent to which respective target strings of characters match the query string and can be applied simply and effectively in practice. Each system may be implemented using one or more computing devices such as a personal computer, a server computer, a handheld or portable device, a flat panel device, a multi-processor system, a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors and memory coupled to the processors and configured to provide the processors with instructions.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for ranking search results, comprising:
receiving a query string;
retrieving a plurality of search results that include a corresponding plurality of target strings that relate to the query string;
segmenting the query string and each of the plurality of target strings;
pairing segments in the query string with respective segments in the target strings to form a plurality of word pairs, wherein one word pair of the plurality of the word pairs comprises a segment from the segmented query string and a segment from one of the segmented target strings;
retrieving a plurality of weights that correspond to the plurality of word pairs based on a mapping of word pairs and their respective weights, wherein a weight measures semantic correlation between words in a word pair; and determining a weighted word length based on the weights corresponding to each of the plurality of target strings, wherein determining a weighted word length for a first target string of the plurality of target strings includes determining a minimum weight corresponding to each segment of the first target string with respect to segmented words in the query string, wherein the minimum weight corresponding to a first segment of the first target string comprises a minimum weight selected from a plurality of weights corresponding to respective ones of a subset of the plurality of word pairs associated with the first segment and the segmented words in the query string; and ranking the plurality of target strings based on their respective weighted word lengths.

2. The method of claim 1, wherein the mapping of word pairs and their respective weights is predetermined.

3. The method of claim 2, wherein the mapping of word pairs and their respective weights is determined by:

acquiring a set of statistical samples;

selecting a first word and a second word from the set of statistical samples, and counting the number of times that both the first and second words occur in the statistical samples as C (the first word, the second word);

counting the number of times that the second word occurs in the statistical samples as $\Sigma C\ (Y_i,$ the second word), wherein $Y_i$ denotes the respective words occurring together with the second word;

calculating a probability of occurrence P of the first word given a condition that the second word occurs as based on the number of times both the first and second words occur in the statistical samples and the number of times that the second word occurs in the statistical samples;

determining a weight that measures semantic correlation between the first and second words by $W=1-P$ during a search for the second word, wherein W is the weight, and P is the probability of the first word on the condition that the second word occurs; and repeating selecting, counting, calculating, and determining steps above to determine the weights measuring semantic correlations between word pairs in the statistical samples; and storing the mapping of the word pairs and their respective weights.

4. The method of claim 3, wherein the acquired set of statistical samples includes a webpage, a user search log, or a user selection log.

5. The method of claim 1, wherein:

the weighted word length is the weighted word length of the shortest sliding window; and determining the weighted word length from the weights and ranking the respective plurality of target strings comprises:

calculating the weighted word lengths of the shortest sliding windows for the plurality of target strings based on minimum weights corresponding to plurality of target strings; and comparing the weighted word lengths of the shortest sliding windows of the plurality of target strings;

wherein a target string with a smaller weighted word length is ranked more highly than a target string with a greater weighted word length.

6. The method of claim 5, wherein calculating the weighted word lengths of the shortest sliding windows for the plurality of target strings based on the minimum weights is based on $$\sum_{i=k}^{h} W_i = \sum_{i=k}^{h} \min_{j=1}^{m} w(T_i, Q_j),$$

wherein W denotes weight, $T_i$ denotes $i^{th}$ segmented word in a target string, k and h respectively denote the starting and ending positions of the shortest sliding window of the target string, $Q_j$ denotes $j^{th}$ segmented word in the query string, and m denotes number of segmented words in the query string.

7. A method for ranking search results, comprising:

receiving a query string;

retrieving a plurality of search results that include a corresponding plurality of target strings that relate to the query string;

segmenting the query string and each of the plurality of target strings;

determining, based on a mapping of word pairs and their respective weights, a minimum weight of each inserted word with respect to segmented words in the query string, wherein the minimum weight of each inserted word comprises a minimum weight selected from a plurality of weights corresponding to respective ones of a plurality of word pairs associated with the inserted word and the segmented words in the query string;

determining, based on a mapping of word pairs and their respective weights, a minimum weight of each deleted word with respect to segmented words in the plurality of target strings;

determining a total edit distance based at least in part on the minimum weight of each inserted word and the minimum weight of each deleted word; and ranking the plurality of target strings based on the total edit distances.

8. The method of claim 7, wherein determining a minimum weight of each inserted word with respect to segmented words in the query string comprises:

determining the plurality of weights of the inserted word with respect to segmented words in the query string based on the mapping of word pairs and their respective weights;

calculating the minimum weight of the inserted word with respect to the respective segmented words in the query string as $$\sum_{t=1}^{n} w_I = \sum_{t=1}^{n} \min_{j=1}^{m} w(I_t, Q_j),$$

wherein W denotes weight, $I_t$ denotes the $t^{th}$ segmented word in the inserted string, n denotes the number of inserted segmented words, $Q_j$ denotes the $j^{th}$ segmented word in the query string, and m denotes the number of segmented words in the query string.

9. The method of claim 7, wherein determining the minimum weight of the deleted word with respect to segmented words in the plurality of target strings comprises:

determining a plurality of weights of the deleted word with respect to the segmented words in a first target string of a plurality of target strings based on the mapping of word pairs and their respective weights;

calculating the minimum weight of the deleted word with respect to the respective segmented words in the first target string as $$\sum_{d=1}^{p} w_D = \sum_{d=1}^{p} \min_{i=1}^{q} w(T_i, D_d),$$

wherein W denotes weight, $T_i$ denotes the $i^{th}$ segmented word in the first target string, q denotes the number of segmented words in the first target string, $D_d$ denotes the $d^{th}$ segmented word in the deleted word, and p denotes the number of deleted segmented words.

10. The method of claim 7, wherein determining the total edit distance comprises:

calculating a plurality of total edit distances for the plurality of target strings as $W_{Total}=W_I+W_D$, wherein $W_{Total}$ denotes the total edit distance, $W_I$ denotes the minimum weight of the inserted word with respect to segmented words in the query string, and $W_D$ denotes the minimum weight of the deleted word with respect to segmented words in one of the plurality of target strings.

11. The method of claim 7, further comprising:

determining a minimum weight of each replacement word; wherein:

determining the total edit distance is further based on the minimum weight of each replacement word; and the total edit distances is calculated as $W_{Total}=W_I+W_D+W_C$, wherein $W_{Total}$ denotes the total edit distance, $W_I$ denotes the minimum weight of the inserted word with respect to the segmented words in the query string, $W_D$ denotes the minimum weight of the deleted word with respect to segmented words in one of the plurality of target strings, and $W_C$ denotes the minimum weight of the replacement word with respect to the segmented words in the query string or the target string.

12. The method of claim 11, wherein determining the minimum weight of the each replacement word includes setting the minimum weight of the edit distance of the replacement word to a preset fixed value.

13. The method of claim 11, wherein determining the minimum weight of the each replacement word includes setting the edit distance of the replacement word to the sum, the average or the maximum of the minimum weight of the inserted word with respect to segmented words in the query string and the minimum weight of the deleted word with respect to the segments word in the target string.

14. A system for ranking search results, comprising:

one or more processors configured to:
  receive a query string;
  retrieve a plurality of search results that include a corresponding plurality of target strings that relate to the query string;
  segment the query string and each of the plurality of target strings;
  pair segments in the query string with respective segments in the target strings to form a plurality of word pairs, wherein one word pair of the plurality of the word pairs comprises a segment from the segmented query string and a segment from one of the segmented target strings;
  retrieve a plurality of weights that correspond to the plurality of word pairs based on a mapping of word pairs and their respective weights, wherein a weight measures semantic correlation between words in a word pair; and
  determine a weighted word length based on the weights corresponding to each of the plurality of target strings, wherein determining a weighted word length for a first target string of the plurality of target strings includes determining a minimum weight corresponding to each segment of the first target string with respect to segmented words in the query string, wherein the minimum weight corresponding to a first segment of the first target string comprises a minimum weight selected from a plurality of weights corresponding to respective ones of a subset of the plurality of word pairs associated with the first segment and the segmented words in the query string; and
  rank the plurality of target strings based on their respective weighted word lengths; and
one or more memories coupled to the one or more processors, configured to provide the one or more processors with instructions.

15. The system of claim 14, wherein the mapping of word pairs and their respective weights is determined by:

acquiring a set of statistical samples;

selecting a first word and a second word from the set of statistical samples, and counting the number of times that both the first and second words occur in the statistical samples as C (the first word, the second word);

counting the number of times that the second word occurs in the statistical samples as $\Sigma C$ ($Y_i$, the second word), wherein $Y_i$ denotes the respective words occurring together with the second word;

calculating a probability of occurrence P of the first word given a condition that the second word occurs as based on the number of times both the first and second words occur in the statistical samples and the number of times that the second word occurs in the statistical samples;

determining a weight that measures semantic correlation between the first and second words by W=1−P during a search for the second word, wherein W is the weight, and P is the probability of the first word on the condition that the second word occurs;

repeating selecting, counting, calculating, and determining steps above to determine the weights measuring semantic correlations between word pairs in the statistical samples; and storing the mapping of the word pairs and their respective weights.

16. The system of claim 14, wherein:

the weighted word length is the weighted word length of the shortest sliding window; and determining the weighted word length from the weights and ranking the respective plurality of target strings comprises:

calculating the weighted word lengths of the shortest sliding windows for the plurality of target strings based on minimum weights corresponding to plurality of target strings; and comparing the weighted word lengths of the shortest sliding windows of the plurality of target strings;

wherein a target string with a smaller weighted word length is ranked more highly than a target string with a greater weighted word length.

17. The system of claim 16, wherein calculating the weighted lengths of the shortest sliding windows for the plurality of target strings based on the minimum weights is based on $$\sum_{i=k}^{h} W_i = \sum_{i=k}^{h} \min_{j=1}^{m} w(T_i, Q_j),$$

wherein W denotes weight, $T_i$ denotes $i^{th}$ segmented word in a target string, k and h respectively denote the starting and ending positions of the shortest sliding window of the target string, $Q_j$ denotes $j^{th}$ segmented word in the query string, and m denotes number of segmented words in the query string.

18. A system for ranking search results, comprising:
one or more processors configured to:
   receive a query string;
   retrieve a plurality of search results that include a corresponding plurality of target strings that relate to the query string;
   segment the query string and each of the plurality of target strings;
   determine, based on a mapping of word pairs and their respective weights, a minimum weight of each inserted word with respect to segmented words in the query string, wherein the minimum weight of each inserted word comprises a minimum weight selected from a plurality of weights corresponding to respective ones of a plurality of word pairs associated with the inserted word and the segmented words in the query string;
   determine, based on a mapping of word pairs and their respective weights, a minimum weight of each deleted word with respect to segmented words in the plurality of target strings;
   determine a total edit distance based at least in part on the minimum weight of each inserted word and the minimum weight of each deleted word; and
   rank the plurality of target strings based on the total edit distances; and
one or more memories coupled to the one or more processors, configured to provide the one or more processors with instructions.

19. The system of claim 18, wherein determining a minimum weight of each inserted word with respect to segmented words in the query string comprises:
   determining the plurality of weights of the inserted word with respect to segmented words in the query string based on the mapping of word pairs and their respective weights;
   calculating the minimum weight of the inserted word with respect to the respective segmented words in the query string as $$\sum_{t=1}^{n} w_I = \sum_{t=1}^{n} \min_{j=1}^{m} w(I_t, Q_j),$$

wherein W denotes weight, $I_t$ denotes the $t^{th}$ segmented word in the inserted string, n denotes the number of inserted segmented words, $Q_j$ denotes the $j^{th}$ segmented word in the query string, and m denotes the number of segmented words in the query string.

20. The system of claim 18, wherein determining the minimum weight of the deleted word with respect to segmented words in the target string comprises:
   determining a plurality of weights of the deleted word with respect to the segmented words in a first target string of a plurality of target strings based on the mapping of word pairs and their respective weights;
   calculating the minimum weight of the deleted word with respect to the respective segmented words in the first target string as $$\sum_{d=1}^{p} w_D = \sum_{d=1}^{p} \min_{i=1}^{q} w(T_i, D_d),$$

wherein W denotes weight, $T_i$ denotes the $i^{th}$ segmented word in the first target string, q denotes the number of segmented words in the target string, $D_d$ denotes the $d^{th}$ segmented word in the deleted word, and p denotes the number of deleted segmented words.

* * * * *